(12) United States Patent
Agrawal et al.

(10) Patent No.: US 12,314,926 B2
(45) Date of Patent: May 27, 2025

(54) METHOD AND PRINTER DRIVER UNIT FOR PERFORMING TRANSACTION BY AUTOMATICALLY TRANSMITTING DATA TO EDC TERMINAL

(71) Applicant: Innoviti Payment Solutions Private Limited, Karnataka (IN)

(72) Inventors: Rajeev Agrawal, Karnataka (IN); Shivendra Meena, Karnataka (IN)

(73) Assignee: Innoviti Payment Solutions Private Limited, Karnataka (IN)

( * ) Notice: Subject to any disclaimer, the term of this patent is extended or adjusted under 35 U.S.C. 154(b) by 146 days.

(21) Appl. No.: 17/914,082

(22) PCT Filed: Apr. 26, 2021

(86) PCT No.: PCT/IB2021/053420
§ 371 (c)(1),
(2) Date: Sep. 23, 2022

(87) PCT Pub. No.: WO2021/220135
PCT Pub. Date: Nov. 4, 2021

(65) Prior Publication Data
US 2023/0123966 A1  Apr. 20, 2023

(30) Foreign Application Priority Data

Apr. 26, 2020  (IN) .............................. 202041008183
Apr. 28, 2020  (IN) .............................. 202041004192

(51) Int. Cl.
*G06Q 20/00* (2012.01)
*G06Q 20/10* (2012.01)
*G06Q 20/20* (2012.01)

(52) U.S. Cl.
CPC ......... *G06Q 20/209* (2013.01); *G06Q 20/102* (2013.01); *G06Q 20/202* (2013.01)

(58) Field of Classification Search
CPC ... G06Q 20/209; G06Q 20/102; G06Q 20/202
See application file for complete search history.

(56) References Cited

U.S. PATENT DOCUMENTS

2004/0041022 A1*  3/2004  Minowa ............. G06Q 30/0273
                                                              235/383
2017/0011375 A1*  1/2017  Takasu .................... G07G 1/12

* cited by examiner

*Primary Examiner* — Rokib Masud
(74) *Attorney, Agent, or Firm* — Bret E. Field; Bozicevic, Field & Francis LLP

(57) ABSTRACT

The present disclosure is related to a printing driver unit, which discloses method and printer driver unit for performing a transaction by automatically transmitting data to an Electronic Data Capture (EDC) terminal. Method includes receiving, by printer driver unit associated with host computing device, first print request including first data related to purchase, from host computing device. Further, the printer driver unit extracts final transaction amount from first data and determines status of EDC terminal upon extracting final transaction amount. When EDC terminal is determined to be in first state, the printer driver unit generates a second print request including extracted final transaction amount and transmits the generated second print request to EDC terminal to facilitate automatic insertion of final transaction amount in EDC terminal to initiate payment transaction. Embodiments herein helps in auto-populating final transaction amount in EDC terminal, without the help of vendor specific billing system.

12 Claims, 7 Drawing Sheets

METHOD AND PRINTER DRIVER UNIT FOR PERFORMING TRANSACTION BY AUTOMATICALLY TRANSMITTING DATA TO EDC TERMINAL

CROSS-REFERENCE TO RELATED APPLICATIONS

The present disclosure claims priority to Indian Provisional Patent Application No. 202041008183, entitled "METHOD AND SYSTEM FOR PRINTING ADDITIONAL DATA AT A POINT OF SALE (POS) TERMINAL", filed on Apr. 26, 2020. The present document is a combination of the Indian Provisional Patent Application No. 202041008183 (title mentioned above in this paragraph) and the Indian Provisional Patent Application No. 202041004192, entitled "METHOD AND SYSTEM FOR PROVIDING INTEGRATION BETWEEN POINT OF SALE (POS) DEVICE AND PAYMENT TERMINAL" filed on Apr. 28, 2020. The contents of each of the aforementioned Indian Provisional Patent Applications are incorporated herein by reference in its entirety.

TECHNICAL FIELD

The present subject matter relates generally to a printer driver unit. More particularly, but not exclusively, discloses method and printer driver unit for performing a transaction by automatically transmitting data to an Electronic Data Capture (EDC) terminal.

BACKGROUND

Generally, Point of Sale (POS) systems, which are a type of sales management system, are commonly used in retail establishments such as supermarkets, convenience stores, departmental stores, and other retail sales stores. Multiple terminal devices (such as electronic cash registers) in the POS systems may operate and execute processes as controlled by applications installed on the terminal devices. A printer may also typically be connected to each terminal device, and produces receipts, coupons, and the like as instructed by the application installed on the terminal devices. Most of the terminal devices that command printing receipts and other forms in the POS systems, for example, use an inbuilt/Original Equipment Manufacturer (OEM) driver as the printer driver, and the object to be printed is converted by the printer driver to raster data, that is then sent to the printer.

FIGS. 1A and 1B illustrate a flow diagram of a conventional POS system comprising a billing system 100a and a payment system 100b. Currently, the billing system 100a (as shown in FIG. 1A) which are adopted in establishments, comprises a host computing device 102 and a printer 104, for the purpose of preparing the bill/invoice and printing the bill/invoice. The host computing device 102 can be, at least one of, but not limited to, a dedicated Point of Sale (POS) device, a computer, a laptop, a desktop, a smartphone, a tablet, a phablet, and the like. Further, payment system 100b (as shown in FIG. 1B) which is currently in use, may comprise an Electronic Data Capture (EDC) terminal 106 and a payment server 108, for the purpose of performing a transaction. The EDC terminal 106 can be, at least one of, but not limited to, a card swiping machine, a payment machine, a card terminal, and the like. A merchant in the retail establishments may be using a third-party (i.e., vendor specific) billing system 100a that may be configured for billing purpose and generating the bill/invoice using the host computing device 102. The conventional POS system as discussed above possess a various limitation. One such limitation is that the billing system 100a may not have a communication link to communicate with the payment system 100b. Since, there is no communication link between the billing system 100a and the payment system 100b, the merchant may need to manually input final transaction amount in the EDC terminal 106 and then, seek the payment authorization from a customer, to complete the transaction/payment by entering the authorization Personal Identification Number (PIN). Based on successful authorization (i.e., using transaction request) and payment confirmation (i.e., using transaction response), a charge slip may be printed in the EDC terminal 106. Upon successful transaction, the merchant may provide an input in the host computing device 102, to print the bill/invoice on the printer 104. Since, the merchant has to manually enter the final transaction amount in the EDC terminal 106, it may be error prone, i.e. a merchant may enter an amount which is different from the final transaction amount, leading to incorrect payment. Also, since, there is no communication link between the billing system 100a and the payment system 100b, financial reconciliation may not be achieved. For instance, the merchant needs to manually determine and match the invoice and bank transaction details, which may be time consuming due to manual intervention, and may also lead to error in financial reconciliation.

In another instance, even if there is communication link between the billing system 100a and the payment system 100b, the merchant may need to use the third-party (i.e., vendor specific) billing system 100a to facilitate automatic insertion (i.e., automatically populate) of the final transaction amount in the EDC terminal 106. Such third-party/vendor specific billing system 100a may not be economically feasible to all merchants, especially small-scale merchants. For instance, the small-scale merchants may use third-party/vendor specific billing system 100a which may not have any specific or a standard protocol. Therefore, it would be difficult to connect such billing systems with third-party/vendor specific billing systems 100a to facilitate auto-population of the bill amount to the EDC terminal, due to compatibility issues which may occur. Further, for co-ordinating between the third-party/vendor specific billing system 100a and payment system 100b requires additional effort, cost, and time. Additionally, such third-party/vendor specific billing system 100a or the payment system 100b may not facilitate for printing bill/invoice in the EDC terminal 106.

The information disclosed in this background of the disclosure section is only for enhancement of understanding of the general background of the invention and should not be taken as an acknowledgment or any form of suggestion that this information forms the prior art already known to a person skilled in the art.

SUMMARY

Disclosed herein is a method of performing a transaction by automatically transmitting data to an Electronic Data Capture (EDC) terminal. The method includes receiving, by a printer driver unit associated with a host computing device, a first print request including first data related to a purchase, from the host computing device. The printer driver unit is initialized to act as an interface between the host computing device and the EDC. Further, the method includes extracting a final transaction amount from the first data. Furthermore, the method includes determining status of the EDC terminal upon extracting the final transaction amount. Thereafter, the method includes generating a second print request including the extracted final transaction amount, when the EDC terminal is determined to be in a first state. Finally, the method includes transmitting the generated second print request to the EDC terminal to facilitate automatic insertion of the final transaction amount in the EDC terminal to initiate a payment transaction.

Disclosed herein is a printer driver unit for performing a transaction by automatically transmitting data to an Electronic Data Capture (EDC) terminal. The printer driver unit includes a processor, a memory communicatively coupled to the processor. The memory stores the processor instructions, which on execution, causes the processor to receive a first print request including first data related to a purchase, from a host computing device. The printer driver unit is initialized to act as an interface between the host computing device and the EDC terminal. Further, the processor is configured to extract a final transaction amount from the first data. Furthermore, the processor is configured to determine status of the EDC terminal upon extracting the final transaction amount. Thereafter, the processor is configured to generate a second print request including the extracted final transaction amount, when the EDC terminal is determined to be in a first state. Finally, the processor is configured to transmit the generated second print request to the EDC terminal to facilitate automatic insertion of the final transaction amount in the EDC terminal to initiate a payment transaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
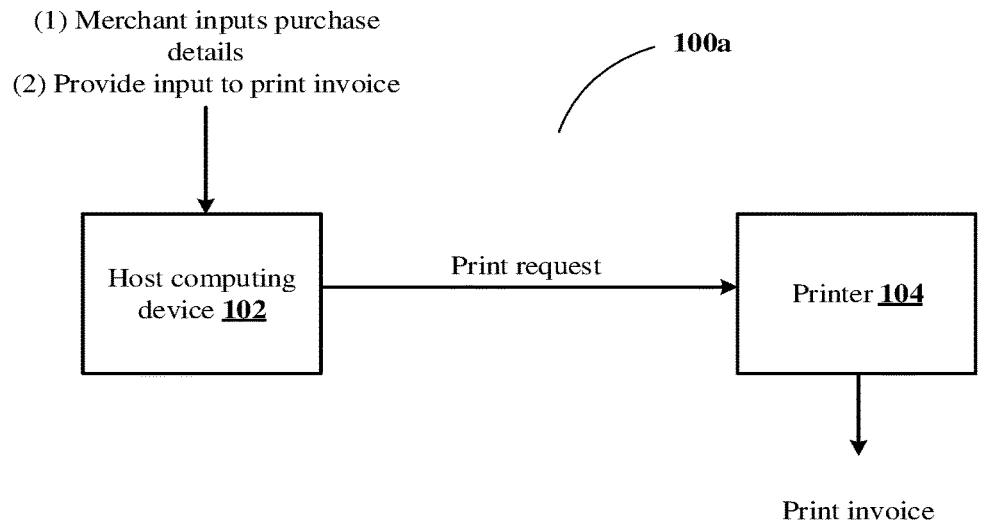
FIGS. 1A and 1B illustrates a flow diagram of a conventional Point of Sale (POS) system comprising a billing system and a payment system.
Figure 1B:
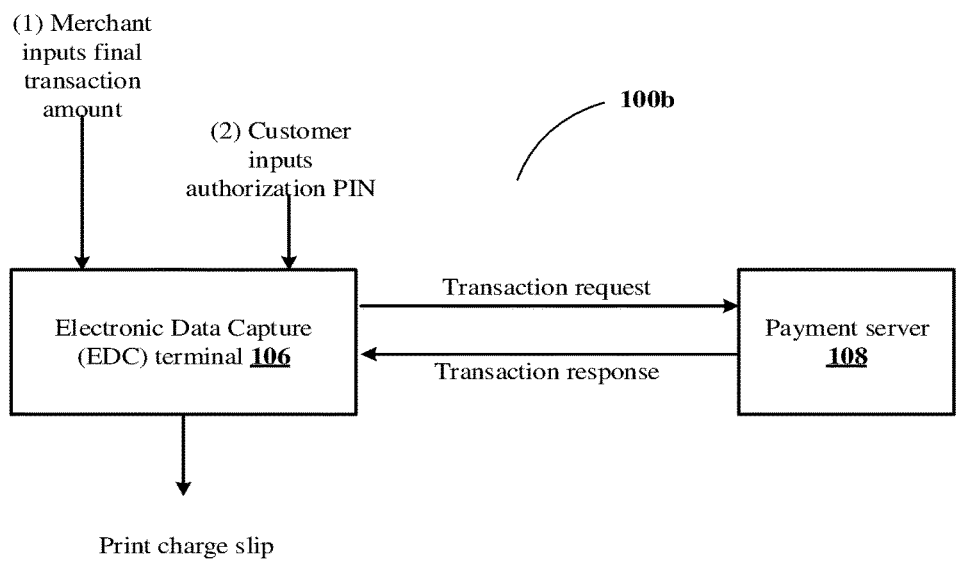

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a printer driver unit for performing a transaction by automatically transmitting data to an Electronic Data Capture (EDC) terminal. The method includes receiving, by a printer driver unit associated with a host computing device, a first print request comprising first data related to a purchase, from the host computing device. The printer driver unit may be initialized to act as an interface between the host computing device and the EDC. Further, the printer driver unit may extract a final transaction amount from the first data. Upon extracting the final transaction amount, the printer driver unit may determine status of the EDC terminal. In one embodiment, status of the EDC may be one of, a first state or a second state. The first state may be indicative of a print acceptance state and a second state may be indicative of a normal state. Thereafter, if the EDC terminal is determined to be in the first state, the printer driver unit may generate a second print request including the extracted final transaction amount. However, if the EDC terminal is determined to be in a second state, the printer driver unit may transmit a state change command to the EDC terminal to convert the EDC terminal from the second state to the first state. Finally, the printer driver unit may transmit the generated second print request to the EDC terminal to facilitate automatic insertion of the final transaction amount in the EDC terminal to initiate a payment transaction. In some embodiments, the printer driver unit may also facilitate printing the first data in the EDC machine, by transmitting a third print request including the first data, to the EDC machine.

Embodiments herein provide the printer driver unit to facilitate automatically transmitting data to an Electronic Data Capture (EDC) terminal, without the need for changing or modifying the vendor specific billing system. Embodiments herein provide integration between the host computing device and the EDC terminal for auto-populating the final transaction amount in the EDC terminal, without the help of vendor specific billing system. Embodiments herein establish an interface between the host computing device and the EDC terminal via the printer driver unit, which in turn eliminates the need to manually input data such as final transaction amount, in the EDC terminal, thereby eliminating even the slightest chance of encountering human errors while manually entering the data. Embodiments herein provides a financial reconciliation based on reconciliation parameters for example, Reference Requisition Number (RRN) and payment Identification (ID) number stored in the host computing device. Embodiments herein helps in regulatory compliance fulfilment for any merchant and fraud detection, due to the financial reconciliation and auto populating the final transaction amount in the EDC terminal, respectively.

A description of an embodiment with several components in communication with each other does not imply that all such components are required. On the contrary, a variety of optional components are described to illustrate the wide variety of possible embodiments of the invention.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2:
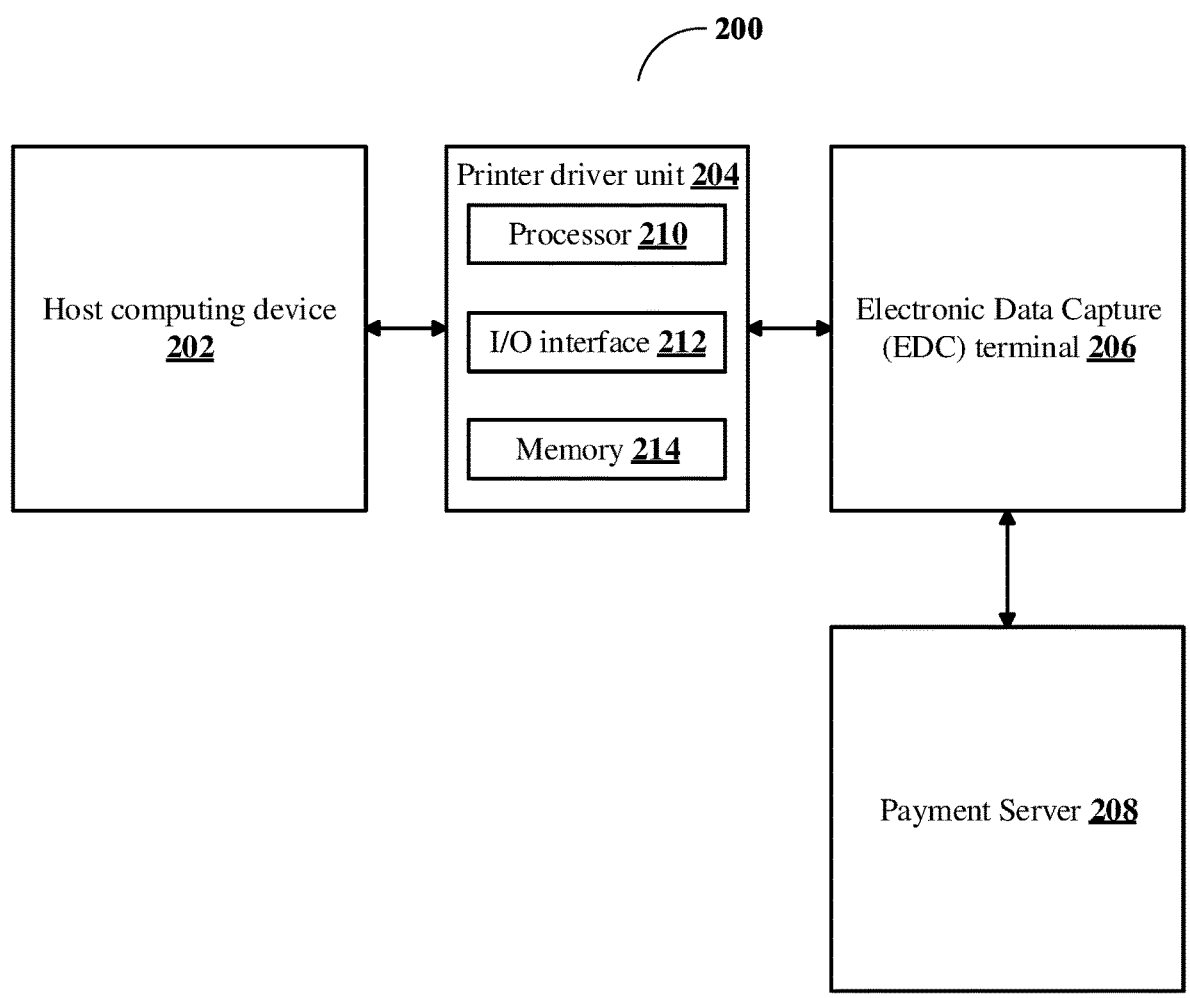
FIG. 2 illustrates an exemplary environment for performing a transaction by automatically transmitting data to an Electronic Data Capture (EDC) terminal, in accordance with some embodiments of the present disclosure.

FIG. 2 illustrates an exemplary environment for performing a transaction by automatically transmitting data to an Electronic Data Capture (EDC) terminal, in accordance with some embodiments of the present disclosure.

The architecture 200 includes a host computing device 202, a printer driver unit 204, and an Electronic Data Capture (EDC) terminal 206. The host computing device 202 may be communicatively connected with the printer driver unit 204 via a communication network. In some embodiments, the printer driver unit 204 may be configured within the host computing device 202. The printer driver unit 204 may be configured to act as an interface between the host computing device 202 and the EDC terminal 206. Further, the printer driver unit 204 may be communicatively coupled to the EDC terminal 206 via the communication network. In some embodiments, the communication network may be at least one of a wired communication network and a wireless communication network. As an example, the host computing device 202 may include at least one of, but not limited to, cellular telephones, smartphones, tablets, phablets, wearable devices, Personal Computers (PCs), laptops, minicomputers, desktops, as well as mobile devices such as handheld computers, Personal Digital Assistants (PDAs), Personal Media Devices (PMDs), Internet of Things (IoT) devices, Virtual Assistants (VAs), notebooks, e-readers, a dedicated device, and the like. The EDC terminal 206 may include at least one of, but not limited to, a card swiping machine, a payment machine, a card terminal, a Point of Sale (POS) terminal, an Electronic funds transfer at Point of Sale (EFTPOS), a smart terminal/smart POS terminal, and the like. Further, the EDC terminal 206 may be associated with a payment server 208 for authorizing a transaction.

Further, the printer driver unit 204 may include a processor 210, an Input/Output (I/O) interface 212 and a memory 214. The I/O interface 212 may be configured to receive data and instructions from the host computing device 202 and EDC terminal 206 in the context of the present disclosure. The processor 210 may extract a final transaction amount and transmit the extracted final transaction amount to the EDC terminal 206.

In some embodiments, the processor 210 may receive a first print request including first data related to a purchase, from a host computing device 202. The first data may include, but not limited to, purchase data and the final transaction amount associated with the purchase data. The purchase data, may include, but not limited to, item/service details, number of items, quantity, rate per quantity, rate for purchased quantity, tax information, bar code, loyalty points information, and so on. Further, the printer driver unit 204 may extract a final transaction amount from the first data. In some embodiments, the final transaction amount may be extracted by analysing the received first data using one or more techniques, which may include, but not limited to, a visual mark-up technique, a geometric learning technique, and an algebraic learning technique. Furthermore, the processor 210 may be configured to determine status of the EDC terminal 206 upon extracting the final transaction amount. In an embodiment, the status of the EDC terminal 206 may be one of the first state that is indicative of a print acceptance state or a second state that is indicative of a normal state. In some embodiments, "normal state" may be a state in which the EDC terminal 206 may accept a manual entry. In an embodiment, prior to determination of the status of the EDC terminal 206, the processor 210 may detect, a product type of the EDC terminal 206. The processor 210 may communicate with the EDC terminal 206 when the product type of the EDC terminal 206 corresponds to a pre-defined product range. The product type may refer to a product specific to one or more vendors, or the product of Original Equipment Manufacturer (OEM). In some embodiments, the product type may be determined based on a vendor identification number and a product identification number associated with the EDC terminal 206. For example, the vendor identification (VID) number and a product identification (PID) number may need to be in series of the pre-defined product range. For instance, the pre-defined product range which includes VID and PID may be a plurality of bit numbers used to identify the EDC terminal 206 to the processor 210.

In some embodiments, the processor 204 may terminate the communication with the EDC terminal 206, if the product type of the EDC terminal 206 is determined to be not belonging to the pre-defined product range. In some embodiments, the EDC terminal 206 that may not correspond to the predefined product range, may be a potential fraud terminal, which means that such EDC terminals may be unauthorized terminals, non-compliant terminals, and the like. In some embodiments, when the status of the EDC terminal 206 is determined to be in the second state, the processor 210 may transmit a state change command to the EDC terminal 206 to convert the EDC terminal 206 from the second state to the first state. In some embodiments, when the EDC terminal 206 is determined to be in a first state, the processor 210 may generate a second print request, that may include, but not limited to, the extracted final transaction amount. Thereafter, the processor 210 may transmit the generated second print request to the EDC terminal 206 to facilitate automatic insertion of the final transaction amount in the EDC terminal 206 to initiate a payment transaction. The EDC terminal 206 may communicate with the payment server 208 for authorizing and initiating the transaction once the authorization is completed. Upon processing the transaction, the payment server 208 may transmit, status of the transaction to the EDC terminal 206. The EDC terminal 206 may in turn transmit the status of the transaction to the processor 210. As an example, status of the transaction may be one of transaction successful or transaction failed. Upon completion of the payment transaction, processor 210 may further transmit a third print request, that may include, but not limited to, the first data, to the EDC terminal 206 to print the first data.

Figure 3:
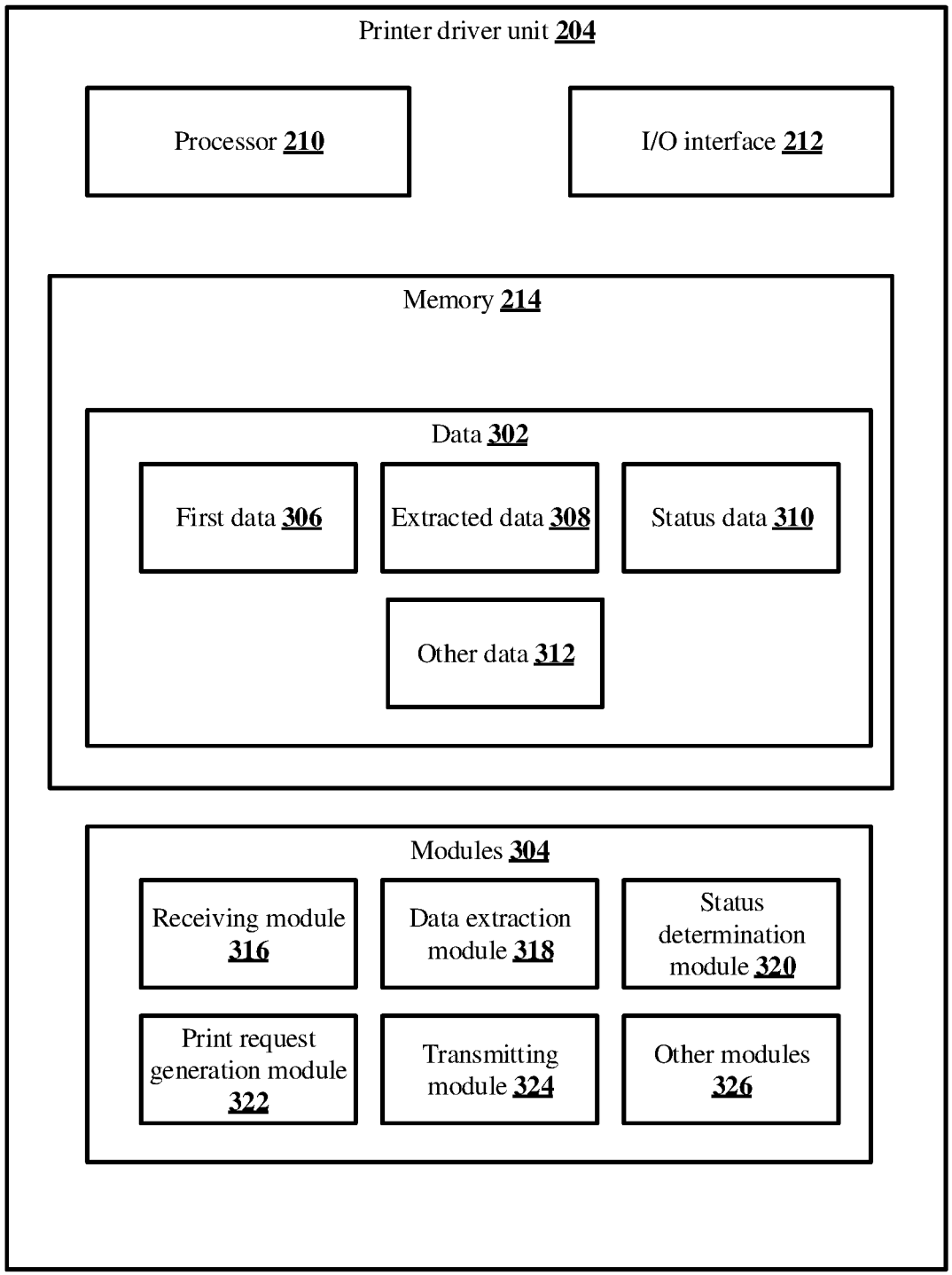
FIG. 3 illustrates an exemplary detailed block diagram of a printer driver unit for performing the transaction by automatically transmitting data to the EDC terminal, in accordance with some embodiments of the present disclosure.

FIG. 3 illustrates an exemplary detailed block diagram of a printer driver unit 204 for performing a transaction by automatically transmitting data to the EDC terminal 206, in accordance with some embodiments of the present disclosure.

In some implementations, the printer driver unit 204 may include data 302 and modules 304. As an example, the data 302 is stored in the memory 214 configured in the printer driver unit 204 as shown in the FIG. 3. In one embodiment, the data 302 may include first data 306, extracted data 308, status data 310, and other data 312.

In an embodiment, the data 302 may be stored in the memory 214 in the form of various data structures. Additionally, the data 302 can be organized using data models, such as relational or hierarchical data models. The other data 312 may store data, including temporary data and temporary files, generated by the modules 304 for performing the various functions of the printer driver unit 204, and one or more predefined rules for launching/relaunching print application in an EDC terminal 206.

In an embodiment, the data 302 stored in the memory 214 may be processed by the modules 304 of the printer unit 204. The modules 304 may be stored within the memory 214. In an example, the modules 304 communicatively coupled to the processor 210 configured in the printer driver unit 204, may also be present outside the memory 214 as shown in FIG. 3 and implemented as hardware. As used herein, the term modules refer to an application-specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 304 may include, for example, a receiving module 316, a data extraction module 318, a status determination module 320, a print request generation module 322, a transmitting module 324, and other modules 326. The other modules 326 may be used to perform various miscellaneous functionalities of the printer driver unit 204. It will be appreciated that such aforementioned modules 304 may be represented as a single module or a combination of different modules.

In some embodiments, the receiving module 316 may receive a first print request including first data related to a purchase, from the host computing device 202. The first print request may include, but not limited to, first data related to a purchase, that may be stored as the first data 306. The purchase data may be data related to the items/services entitled by a customer. For instance, consider a supermarket scenario, the purchase data may include, but not limited to, item/service details, number of items, quantity, rate per quantity, rate for purchased quantity, tax information, bar code, loyalty points information, and so on.

In some embodiments, the data extraction module 318 may extract a final transaction amount from the first data 306. As an example, the final transaction amount may be the total bill amount of a user's purchase, for which the user is ought to make a payment. The data extraction module 318 may extract the final transaction amount by analysing the received first data 306 using at least one of a visual mark-up technique, a geometric learning technique, and an algebraic learning technique. In some embodiments, the visual mark-up technique may extract information (i.e., final transaction amount) from an unstructured document through visual mark-up at an estimated relative location of the final transaction amount. In some embodiments, the geometric learning technique may extract information (i.e., final transaction amount) from an unstructured document by capturing data that may aid in identifying the location and position of the final transaction amount. In some embodiments, the algebraic learning technique may extract information (i.e., final transaction amount) by checking different amounts/costs for multiple items, using enforcing algebraic rules, to identify the final transaction amount. The algebraic rules may be commutative properties of addition, multiplication, subtraction, division, and so on, of the amounts/costs for multiple items purchased by the user. In some embodiments, algebraic rule may be a method for describing the relationship between two variables such as amounts/costs/rate one or more item. The final transaction amount may be stored as the extracted data 308. In some embodiment, data extraction module 318 may be a Machine Learning (ML) module, which is trained with first data to identify the final transaction amount. Further, the extracted final transaction amount may need to be inserted in the EDC terminal 206 to initiate a payment transaction. Such insertion of the final transaction in the EDC terminal 206 amount may initially require checking of product type and the status of the EDC terminal 206. In some embodiments, the product type may refer to a product specific to one or more vendors, or the product of Original Equipment Manufacturer (OEM). The processor 210 may communicate with the EDC terminal 206 to check if the product type of the EDC terminal 206 corresponds to a pre-defined product range. In some embodiments, the product type may be determined based on a vendor identification (VID) number and a product identification (PID) number associated with the EDC terminal 206. For example, the VID number and the PID number may need to be in series of the pre-defined product range. For instance, the pre-defined product range which includes the VID number and the PID number may be a plurality of bit numbers used to identify the EDC terminal 206 to the processor 210. In some embodiments, the processor 210 may terminate the communication with the EDC terminal 206, if the product type of the EDC terminal 206 is determined to be not belonging to the pre-defined product range. In some embodiments, the EDC terminal 206 that may not correspond to the predefined product range, may be a potential fraud terminal, which means that such EDC terminals may be unauthorized terminals, non-compliant terminals, and the like. In some embodiments, when the EDC terminal 206 is determined to be in the predefined product range, the processor 210 may synchronize with the EDC terminal 206 and transmit a command to the EDC terminal 206 to enable an accessory mode. The accessory mode in the EDC terminal 206 may allow external hardware to interact with the EDC terminal 206 in the accessory mode. This enables the host computing device 202 via the printer driver unit 204, to detect the EDC terminal 206 as accessory and use as a printer device.

Further, in some embodiments, upon extracting the final transaction amount and also determining that the EDC terminal 206 belongs to the predefined product range, the status determination module 320 may determine status of the EDC terminal 206. The status of the EDC terminal 206 may be stored as the status data 310. For instance, status of the EDC terminal 206 may be one of the first state that is indicative of a print acceptance state or a second state that is indicative of a normal state. In some embodiments, "normal state" may be a state in which the EDC terminal 206 may accept a manual entry. In the "print acceptance state", the EDC terminal 206 may accept the print request such as second/third print request. In some embodiments, the status determination module 320 may determine status of the EDC terminal 206 during initial connection of EDC terminal 206 and the host computing device 202 or before generating a second print request and/or a third print request. In some embodiments, during the initial connection of EDC terminal 206 and the host computing device 202 or before generating the second print request and/or the third print request, the processor 210 may transmit a command to the EDC terminal 206 to launch a print application in the EDC terminal 206. In some embodiments, launching of the print application in the EDC terminal 206 may change state of the EDC terminal 206 from the "normal state" to the "print acceptance state". Therefore, for determining status of the EDC terminal 206, the status determining module 320 may probe the EDC terminal 206 to determine whether the print application has been launched in the EDC terminal 206 or not. If the print application is determined as launched in the EDC terminal 206, the status determining module 320 may determine the status of the EDC terminal to be in the first state i.e. in the "print acceptance state", which means that the EDC terminal 206 may be ready for accepting the print request such as the second request/third request from the printer driver unit 204. The status of the EDC terminal 206 is now in the first state which is indicative of a print acceptance state. On the contrary, if the print application is determined as not launched in the EDC terminal 206, the status determining module 320 may determine the status of the EDC terminal to be in the second state i.e. in the "normal state", which means that the EDC terminal 206 may accept only manual inputs and not print requests such as the second request/third request from the printer driver unit 204. In some embodiments, the EDC terminal 206 may be in the first state i.e. "print acceptance state", based on one or more predefined rules. As an example, consider a rule defines a predefined time period after which the print application needs to be relaunched. In such scenarios, the EDC terminal may be in the first state until expiry of the predefined time period from a launch time.

In some embodiments, the print request generation module 322 may generate a second print request including the extracted final transaction amount, when the EDC terminal 206 is determined to be in the first state. In some embodiments, when the status of the EDC terminal 206 is determined to be in the second state, the status determination module 320 may transmit a state change command to the EDC terminal 206 to convert the EDC terminal 206 from the second state to the first state. As an example, the state change command may include commanding the EDC terminal 206 to allow launch of the print application based on the command received from the processor 210.

In some embodiments, the transmitting module 324 may transmit the generated second print request to the EDC terminal 206 to facilitate automatic insertion of the final transaction amount in the EDC terminal 206 to initiate a payment transaction. The EDC terminal 206 may thereafter connect with the payment server 208 for authorizing and initiating the transaction once the authorization is completed. Upon processing the transaction, the payment server 208 may transmit, the status of the transaction to the EDC terminal 206. In some embodiments, the status of the transaction may be one of transaction successful or transaction failed. The EDC terminal 206 may in turn transmit the status of the transaction to the processor 210. Upon completion of the payment transaction, print request generation module 322 may further transmit a third print request, that may include, but not limited to, the first data 306, to the EDC terminal 206 to print the first data 306.

The present disclosure is explained below with the help of some exemplary scenarios. However, this should not be construed as a limitation of the present disclosure as the present disclosure may be applicable to other scenarios as well.

Figure 4A:
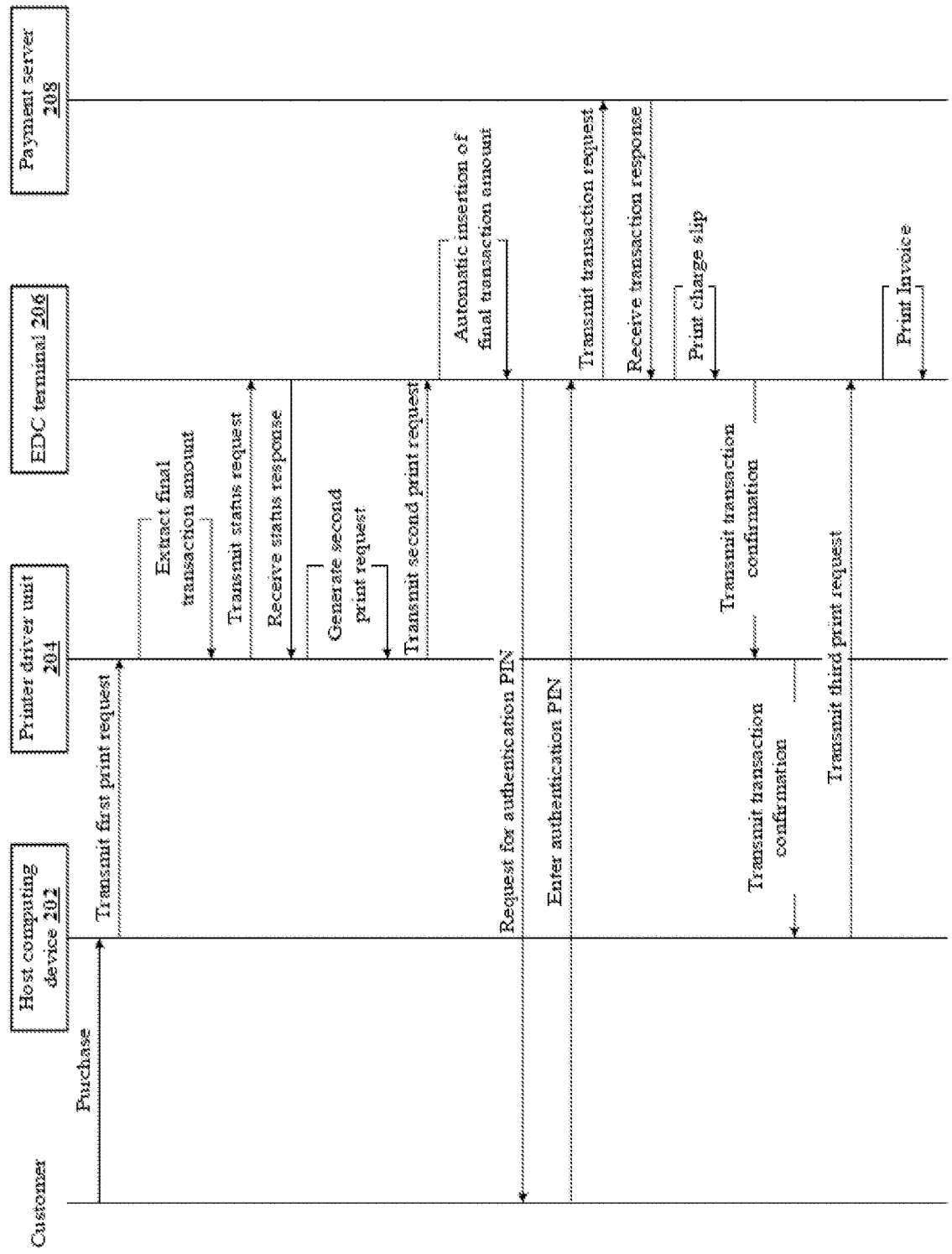
FIG. 4A illustrates an exemplary sequence diagram for performing the transaction by automatically transmitting data to the EDC terminal using the printer driver unit of FIG. 3, in accordance with some embodiments of the present disclosure.

FIG. 4A illustrates an exemplary sequence diagram for performing the transaction by automatically transmitting data to the EDC terminal 206 using the printer driver unit of FIG. 3, in accordance with some embodiments of the present disclosure.

For instance, consider a supermarket scenario where a customer makes a purchase and provides the purchased items (or services) to a merchant. The merchant in turn inputs the purchased items by scanning the items or by any other technique, in the host computing device 202. Further, the merchant may provide print request input in the host computing device 202, and the host computing device 202 transmits the print request referred as 'first print request' to the printer driver unit 204, as shown in FIG. 4A. The first print request includes first data 306 related to a purchase, and the first data 306 includes purchase data and the final transaction amount associated with the purchase data. In this context, the first data 306 for instance, may include, but not limited to, item/service details, number of items, quantity, rate per quantity, rate for purchased quantity, tax information, bar code, loyalty points information, final transaction amount or total amount, and so on. Upon receiving the first print request, the printer driver unit 204, extracts the final transaction amount from the received first print request including the first data 306. Upon extracting the final transaction amount, the printer driver unit 204 may determine the status of the EDC terminal 206, by transmitting a status request to the EDC terminal 206. In turn, the EDC terminal 206 may respond to the status request by transmitting back the status response to the printer driver unit 204. The status of the EDC terminal 206 may be one of the first state indicative of a print acceptance state or a second state indicative of a normal state. Upon determining the status of the EDC terminal 206 to be in the second state, the printer driver unit 204 may transmit a state change command to the EDC terminal 206, to convert the EDC terminal 206 from the second state to the first state.

Figure 4B:
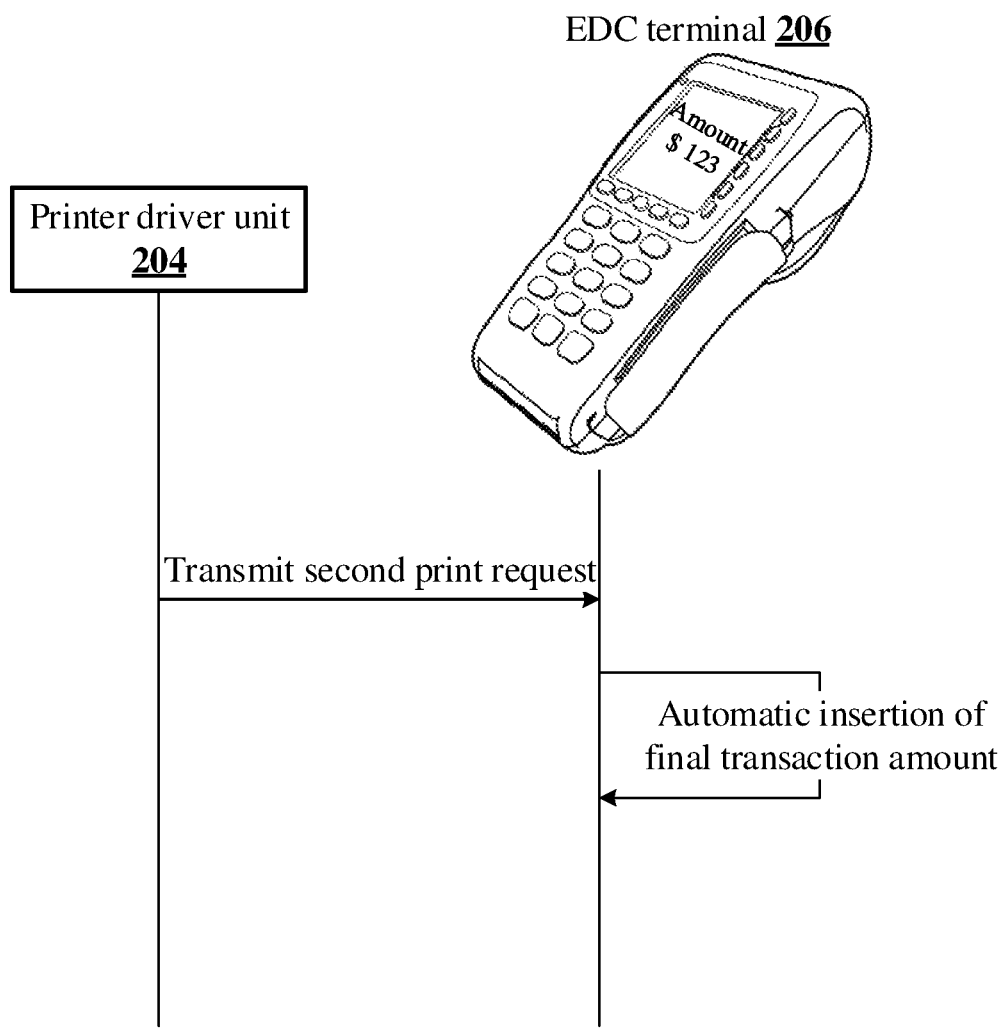
FIG. 4B illustrates an exemplary sequence diagram for auto-populating a final transaction amount in the EDC terminal, in accordance with some embodiments of the present disclosure.

Once, the EDC terminal 206 is determined to be in the first state, the printer driver unit 204 may generate the second print request and transmit the generated second print request to the EDC terminal 206. The second print request may include the extracted final transaction amount. Upon receiving the second print request including the final transaction amount, the EDC terminal 206 may automatically read the second print request and insert the final transaction amount, for instance, in a field associated with the final transaction amount on the display of the EDC terminal 206 as shown in the FIG. 4B. Further, the EDC terminal 206 may request the customer to authorize the transaction by dipping the payment card and authenticate using a Personal Identification Number (PIN). After dipping the card, for instance, a Reference Requisition Number (RRN) may be generated at the payment server 208 and provides the same RRN to the EDC terminal 206. Once, the customer inputs the authentication PIN in the EDC terminal 206, the EDC terminal 206 may transmit a transaction request to the payment server 208. In turn, the payment server 208 may provide transaction response to the EDC terminal 206. In case, if the authentication PIN entered by the customer is incorrect or if there are no sufficient funds in a bank account associated with the card, then the payment server 208 may transmit a message as 'incorrect PIN' or 'insufficient funds', respectively, as transaction response to the EDC terminal 206. If the authentication PIN entered by the customer is correct and if there are sufficient funds in the bank account associated with the card, then the payment server 208 may transmit 'transaction success' message, as transaction response to the EDC terminal 206. Upon receiving the successful transaction response, the EDC terminal 206 may print a charge slip including a status of the transaction. The merchant and banks associated with the payment server 208 may possess the fund transfer report which contains the RRN for reconciliation purposes. Thus, enabling the merchant to match the RRN received from the fund transfer report as well as from the host computing device 202, which includes payment status for all the invoices. This helps in the reconciliation process to the merchant.

Further, the EDC terminal 206 may transmit a transaction confirmation to the printer driver unit 204. Subsequently, the printer driver unit 204 may transmit the transaction confirmation to the host computing device 202. Upon receiving the transaction confirmation, the host computing device 202 may transmit a third print request to the EDC terminal 206. The third print request may include the first data 306. Finally, the EDC terminal 206 may print invoice, upon receiving the third print request which includes the first data 306. In some other embodiments, the third print request may be transmitted simultaneously with the first print request from the host computing device 202 to the EDC terminal 206. In such a scenario, the EDC terminal 206 may place the third print request in a waiting queue, until the "transaction successful" response is received from the payment server 208. Upon receiving the "transaction successful" response, the EDC terminal 206 may print an invoice/bill, by moving the third print request from the waiting queue to printing queue.

Figure 5:
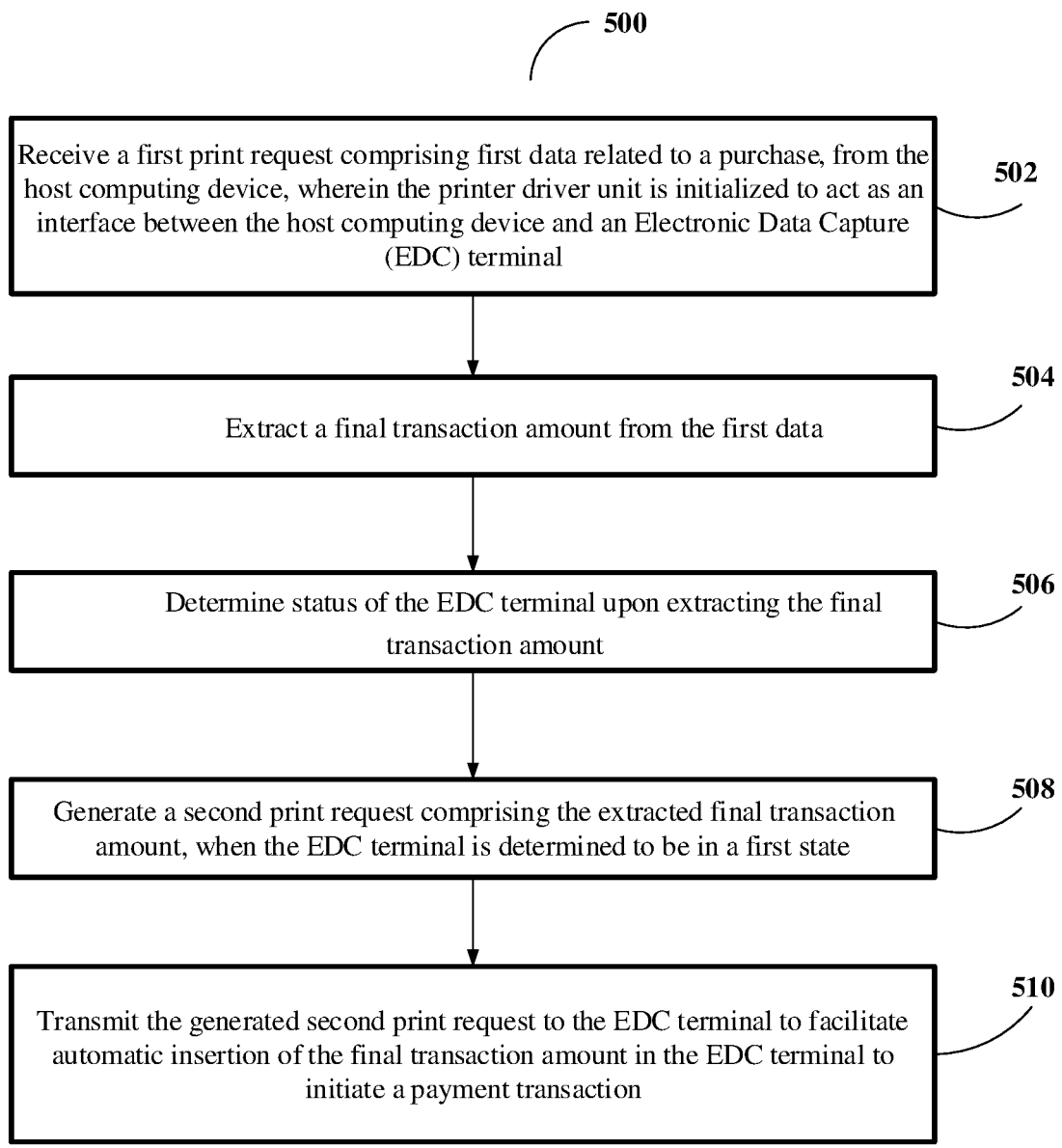
FIG. 5 is a flowchart depicting a method of performing the transaction by automatically transmitting data to the EDC terminal, in accordance with some embodiments of the present disclosure.

FIG. 5 is a flowchart depicting a method of performing the transaction by automatically transmitting data to the EDC terminal 206, in accordance with some embodiments of the present disclosure.

As illustrated in FIG. 5, the method 500 includes one or more blocks illustrating a method of performing the transaction by automatically transmitting data to the EDC terminal 206. The method 500 may be described in the general context of computer-executable instructions. Generally, computer-executable instructions can include routines, programs, objects, components, data structures, procedures, modules, and functions, which perform functions or implement abstract data types.

The order in which the method 500 is described is not intended to be construed as a limitation, and any number of the described method blocks can be combined in any order to implement the method 500. Additionally, individual blocks may be deleted from the methods without departing from the spirit and scope of the subject matter described herein. Furthermore, the method 500 can be implemented in any suitable hardware, software, firmware, or combination thereof.

At block 502, the method 500 may include receiving, by a printer driver unit 204 associated with a host computing device 202, a first print request including first data 306 related to a purchase, from the host computing device 202. In some embodiments, the first data 306 includes purchase data and a final transaction amount associated with the purchase data.

At block 504, the method 500 may include extracting, by the printer driver unit 204, a final transaction amount from the first data 306. In some embodiments, the printer driver unit 204 may extract the final transaction amount by analysing the received first data 306. In some embodiments, the printer driver unit 204 may analyse the first data 306 by using a technique which may include, but not limited to, a visual mark-up technique, a geometric learning technique, an algebraic learning technique or a combination of any of the aforementioned techniques.

At block 506, the method 500 may include determining, by the printer driver unit 204, status of the EDC terminal 206 upon extracting the final transaction amount. The status of the EDC terminal 206 may be one of the first state indicative of a print acceptance state or a second state indicative of a normal state.

At block 508, the method 500 may include generating, by the printer driver unit 204, a second print request including the extracted final transaction amount, when the EDC terminal 206 is determined to be in the first state. In some embodiments, if the printer driver unit 204 determines the status of the EDC terminal 206 to be in the second state, the printer driver unit 204 may transmit the state change command to the EDC terminal 206 to convert the EDC terminal 206 from the second state to the first state.

At block 510, the method 500 may include transmitting, by the printer driver unit 204, the generated second print request to the EDC terminal 206 to facilitate automatic insertion of the final transaction amount in the EDC terminal 206 to initiate a payment transaction. Upon completion of the payment transaction, printer driver unit 204 may further transmit a third print request, that may include, but not limited to, the first data 306, to the EDC terminal 206 to print the first data 306.

Figure 6:
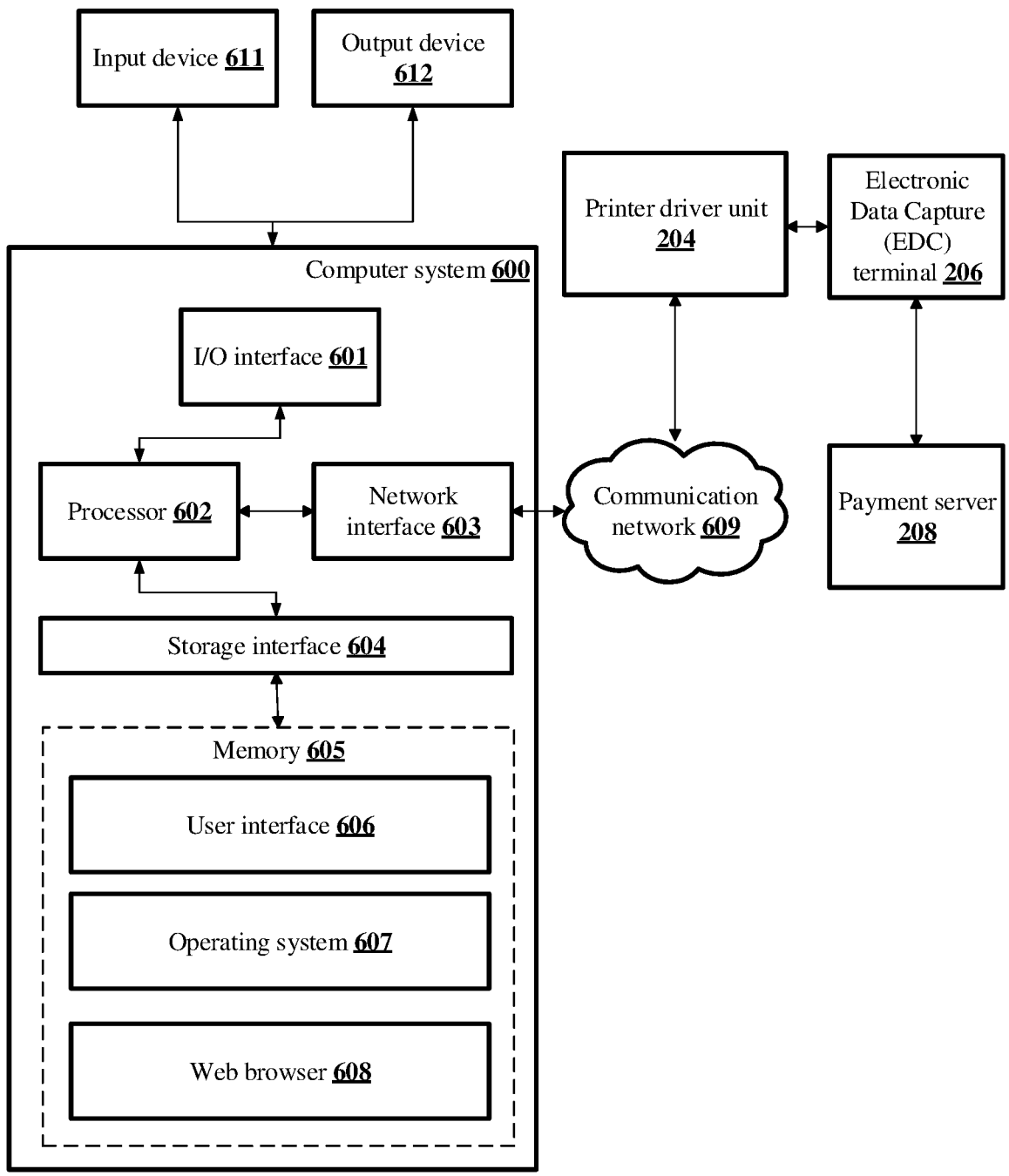
FIG. 6 is a block diagram of an exemplary computer system for implementing embodiments consistent with the present disclosure.

FIG. 6 is a block diagram of an exemplary computer system 600 for implementing embodiments consistent with the present disclosure.

In some embodiments, FIG. 6 illustrates a block diagram of an exemplary computer system 600 for implementing embodiments consistent with the present invention. In some embodiments, the computer system 600 can be a host computing device 202 that is used for performing a transaction by automatically transmitting data to an Electronic Data Capture (EDC) terminal 206, as shown in the FIG. 6. In some other embodiments, the computer system 600 can be a printer driver unit 204 associated with the host computing device 202 to perform a transaction by automatically transmitting data to an Electronic Data Capture (EDC) terminal 206. The computer system 600 may include a central processing unit ("CPU" or "processor") 602. The processor 602 may include at least one data processor for executing program components for executing user or system-generated business processes. A user may include a person, a person using a device such as those included in this invention, or such a device itself. The processor 602 may include specialized processing units such as integrated system (bus) controllers, memory management control units, floating-point units, graphics processing units, digital signal processing units, etc. The processor 602 may be disposed in communication with input devices 611 and output devices 612 via I/O interface 601. The I/O interface 601 may employ communication protocols/methods such as, without limitation, audio, analog, digital, stereo, IEEE-1395, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 601, computer system 600 may communicate with input devices 611 and output devices 612. In some embodiments, the processor 602 may be disposed in communication with a communication network 609 via a network interface 603. The network interface 603 may communicate with the communication network 609. The network interface 603 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 603 and the communication network 609, the computer system 600 may communicate with a printer driver unit 204. The computer system 600 may include, but not limited to, cellular telephones, smartphones, tablets, phablets, wearable devices, Personal Computers (PCs), laptops, minicomputers, desktops, as well as mobile devices such as handheld computers, Personal Digital Assistants (PDAs), Personal Media Devices (PMDs), Internet of Things (IoT) devices, Virtual Assistants (VAs), notebooks, e-readers, a dedicated device, and the like. The printer driver unit 204 may communicate with an EDC terminal 206. The EDC terminal 206 may include, but not limited to, a card swiping machine, a payment machine, a card terminal, a Point of Sale (POS) terminal, an Electronic funds transfer at Point of Sale (EFTPOS), a smart terminal/smart POS terminal, and the like. Further, the EDC terminal 206 may be in communication with a payment server 208, via wired or wireless communication network. The communication network 609 can be implemented as one of the different types of networks, such as intranet or Local Area Network (LAN) and such within the organization. The communication network 609 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 609 may include a variety of network devices, including routers, bridges, servers, computing devices, storage devices, etc. In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as Serial Advanced Technology Attachment (SATA), Integrated Drive Electronics (IDE), IEEE-1395, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc. The memory 605 may store a collection of program or database components, including, without limitation, a user interface 606, an operating system 607, a web browser 608, etc. In some embodiments, the computer system 600 may store user/application data, such as the data, variables, records, etc. as described in this invention. Such databases may be implemented as fault-tolerant, relational, scalable, secure databases such as Oracle or Sybase. Operating system 607 may facilitate resource management and operation of the computer system 600. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. User interface 606 may facilitate display, execution, interaction, manipulation, or operation of program components through textual or graphical facilities. For example, user interfaces may provide computer interaction interface elements on a display system operatively connected to computer system 600, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

Computer system 600 may implement a web browser 608 stored-program components. Web browser 608 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX, DHTML, ADOBE® FLASH®, JAVASCRIPT®, JAVA®, Application Programming Interfaces (APIs), etc. Computer system 600 may implement a mail server stored program component. The mail server may be an Internet mail server such as Microsoft Exchange, or the like. The mail server may utilize facilities such as ASP, ACTIVEX®, ANSI® C++/C#, MICROSOFT®, NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc. Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Embodiments herein provide the printer driver unit to facilitate automatically transmitting data to an Electronic Data Capture (EDC) terminal, without the need for changing or modifying the vendor specific billing system. Embodiments herein provide integration between the host computing device and the EDC terminal for auto-populating the final transaction amount in the EDC terminal, without the help of vendor specific billing system. Embodiments herein establish an interface between the host computing device and the EDC terminal via the printer driver unit, which in turn eliminates the need to manually input data such as final transaction amount, in the EDC terminal, thereby eliminating even the slightest chance of encountering human errors while manually entering the data. Embodiments herein provide a financial reconciliation based on Reference Requisition Number (RRN) and payment Identification (ID) number stored in the host computing device. Embodiments herein help in regulatory compliance fulfilment for any merchant and fraud detection, due to the financial reconciliation and auto populating the final transaction amount in the EDC terminal, respectively.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described method and printer driver unit for performing a transaction by automatically transmitting data to an Electronic Data Capture (EDC) terminal. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

Referral Numerals

| Reference Number | Description |
| --- | --- |
| 200 | Architecture |
| 202 | Host computing device |
| 204 | Printer driver unit |
| 206 | Electronic Data Capture (EDC) terminal |
| 208 | Payment server |
| 210 | Processor |
| 212 | Input/Output (I/O) interface |
| 214 | Memory |
| 302 | Data |
| 304 | Modules |
| 306 | First data |
| 308 | Extracted data |
| 310 | Status data |
| 312 | Other data |
| 316 | Receiving module |
| 318 | Data extraction module |
| 320 | Status determination module |
| 322 | Print request generation module |
| 324 | Transmitting module |
| 326 | Other modules |
| 600 | Computer system |
| 601 | I/O Interface of computer system |
| 602 | Processor of computer system |
| 603 | Network interface |
| 604 | Storage interface |
| 605 | Memory of computer system |
| 606 | User interface |
| 607 | Operating system |
| 608 | Web browser |
| 609 | Communication network |
| 611 | Input device |
| 612 | Output device |

We claim:

1. A method of performing a transaction by automatically transmitting data to an Electronic Data Capture (EDC) terminal (206), the method comprising:
receiving, by a printer driver unit (204) associated with a host computing device (202), a first print request comprising first data related to a purchase, from the host computing device (202), wherein the printer driver unit (204) is initialized to act as an interface between the host computing device (202) and an Electronic Data Capture (EDC) terminal (206);

extracting, by the printer driver unit (204), a final transaction amount from the first data;

determining, by the printer driver unit (204), status of the EDC terminal (206) upon extracting the final transaction amount by transmitting a status request to the EDC terminal (206), wherein the status of the EDC terminal (206) is one of a first state indicative of a print acceptance state or a second state indicative of a normal state;

generating, by the printer driver unit (204), a second print request comprising the extracted final transaction amount, when the EDC terminal (206) is determined to be in a first state; and transmitting, by the printer driver unit (204), the generated second print request to the EDC terminal (206) to facilitate automatic insertion of the final transaction amount in the EDC terminal (206) to initiate a payment transaction.

2. The method as claimed in claim 1, wherein the method further comprises:

transmitting, by the printer driver unit (204), a third print request comprising the first data, to the EDC terminal (206) to print the first data, upon completion of the payment transaction.

3. The method as claimed in claim 1, wherein the first data comprises purchase data and the final transaction amount associated with the purchase data.

4. The method as claimed in claim 1, wherein the method, upon determining the status of the EDC terminal (206) to be in the second state, performs:

transmitting, by the printer driver unit (204), a state change command to the EDC terminal (206) to convert the EDC terminal (206) from the second state to the first state.

5. The method as claimed in claim 1 further comprises determining, by the printer driver unit (204), product type of the EDC terminal (206), prior to determination of the status of the EDC terminal (206), wherein the printer driver unit (204) communicates with the EDC terminal (206) when the product type of the EDC terminal (206) corresponds to a pre-defined product range.

6. The method as claimed in claim 1, wherein extracting the final transaction amount comprises analysing the received first data using at least one of a visual mark-up technique, a geometric learning technique, and an algebraic learning technique.

7. A printer driver unit (204) for performing a transaction by automatically transmitting data to an Electronic Data Capture (EDC) terminal (206), the printer driver unit (204) comprising:

a processor (210); and a memory (214) communicatively coupled to the processor (210), wherein the memory (214) stores the processor (210) instructions, which on execution, causes the processor (210) to:

receive a first print request comprising first data related to a purchase, from a host computing device (202), wherein the printer driver unit (204) is initialized to act as an interface between the host computing device (202) and an Electronic Data Capture (EDC) terminal (206);

extract a final transaction amount from the first data;

determine status of the EDC terminal (206) upon extracting the final transaction amount by transmitting a status request to the EDC terminal (206), wherein the status of the EDC terminal (206) is one of a first state indicative of a print acceptance state or a second state indicative of a normal state;

generate a second print request comprising the extracted final transaction amount, when the EDC terminal (206) is determined to be in a first state; and transmit the generated second print request to the EDC terminal (206) to facilitate automatic insertion of the final transaction amount in the EDC terminal (206) to initiate a payment transaction.

8. The printer driver unit (204) as claimed in claim 7, wherein the processor (210) is further configured to:

transmit a third print request comprising the first data, to the EDC terminal (206) to print the first data, upon completion of the payment transaction.

9. The printer driver unit (204) as claimed in claim 7, wherein the first data comprises purchase data and the final transaction amount associated with the purchase data.

10. The printer driver unit (204) as claimed in claim 7, wherein, upon determining the status of the EDC terminal (206) to be in the second state, the processor (210) is further configured to:

transmit a state change command to the EDC terminal (206) to convert the EDC terminal (206) from the second state to the first state.

11. The printer driver unit (204) as claimed in claim 7, wherein the processor (210) is further configured to detect, product type of the EDC terminal (206), prior to determination of the status of the EDC terminal (206), wherein the printer driver unit (204) communicates with the EDC terminal (206) when the product type of the EDC terminal (206) corresponds to a pre-defined product range.

12. The printer driver unit (204) as claimed in claim 7, wherein, for extracting the final transaction amount, the processor (210) is configured to analyse the received first data using at least one of a visual mark-up technique, a geometric learning technique, and an algebraic learning technique.

* * * * *